(12) United States Patent
Garcia-Crespo

(10) Patent No.: US 8,740,571 B2
(45) Date of Patent: Jun. 3, 2014

(54) TURBINE BUCKET FOR USE IN GAS TURBINE ENGINES AND METHODS FOR FABRICATING THE SAME

(75) Inventor: Andres Garcia-Crespo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 581 days.

(21) Appl. No.: 13/042,034

(22) Filed: Mar. 7, 2011

(65) Prior Publication Data

US 2013/0108438 A1 May 2, 2013

(51) Int. Cl.
*F01D 5/14* (2006.01)

(52) U.S. Cl.
USPC .................. 416/230; 416/241 B; 29/889.71; 29/889.7

(58) Field of Classification Search
USPC .......... 415/173.1; 416/224, 228, 229 R, 230, 416/229 A, 241 B; 29/889.71
See application file for complete search history.

(56) References Cited

U.S. PATENT DOCUMENTS

| | | | |
|---|---|---|---|
| 3,967,996 A * | 7/1976 | Kamov et al. | 156/156 |
| 4,111,606 A * | 9/1978 | Prewo | 416/224 |
| 4,583,274 A * | 4/1986 | Moracz et al. | 29/889.71 |
| 4,869,645 A | 9/1989 | Verpoort | |
| 4,884,820 A | 12/1989 | Jackson et al. | |
| 5,059,095 A | 10/1991 | Kushner et al. | |
| 5,382,453 A * | 1/1995 | Mason | 427/249.2 |
| 5,660,523 A | 8/1997 | Lee | |
| 5,932,356 A | 8/1999 | Sileo et al. | |
| 6,224,337 B1 | 5/2001 | Lieland et al. | |
| 6,468,040 B1 | 10/2002 | Grylls et al. | |
| 6,634,860 B2 * | 10/2003 | Lee et al. | 416/97 R |
| 6,648,596 B1 | 11/2003 | Gryllis et al. | |
| 6,709,230 B2 * | 3/2004 | Morrison et al. | 415/115 |
| 6,746,755 B2 * | 6/2004 | Morrison et al. | 428/166 |
| 6,991,430 B2 | 1/2006 | Stec et al. | |
| 7,247,002 B2 * | 7/2007 | Albrecht et al. | 416/224 |
| 7,393,182 B2 | 7/2008 | Matheny | |
| 7,510,379 B2 | 3/2009 | Marusko et al. | |
| 7,579,094 B2 | 8/2009 | Subramanian et al. | |
| 7,645,123 B1 | 1/2010 | Liang | |
| 8,247,062 B2 * | 8/2012 | Morrison et al. | 428/156 |
| 2005/0164027 A1 * | 7/2005 | Lau et al. | 428/632 |
| 2007/0248750 A1 | 10/2007 | Allen | |
| 2007/0292273 A1 | 12/2007 | Downs | |
| 2008/0187441 A1 * | 8/2008 | Schreiber | 416/229 R |
| 2010/0028594 A1 * | 2/2010 | Kray et al. | 428/114 |

FOREIGN PATENT DOCUMENTS

GB 2027496 A * 2/1980

* cited by examiner

*Primary Examiner* — Edward Look
*Assistant Examiner* — Danielle M Christensen
(74) *Attorney, Agent, or Firm* — Armstrong Teasdale LLP

(57) ABSTRACT

A turbine bucket for use with a turbine engine. The turbine bucket includes an airfoil that extends between a root end and a tip end. The airfoil includes an outer wall that defines a cavity that extends from the root end to the tip end. The outer wall includes a first ceramic matrix composite (CMC) substrate that extends a first distance from the root end to the tip end. An inner wall is positioned within the cavity. The inner wall includes a second CMC substrate that extends a second distance from the root end towards the tip end that is different than the first distance.

18 Claims, 8 Drawing Sheets

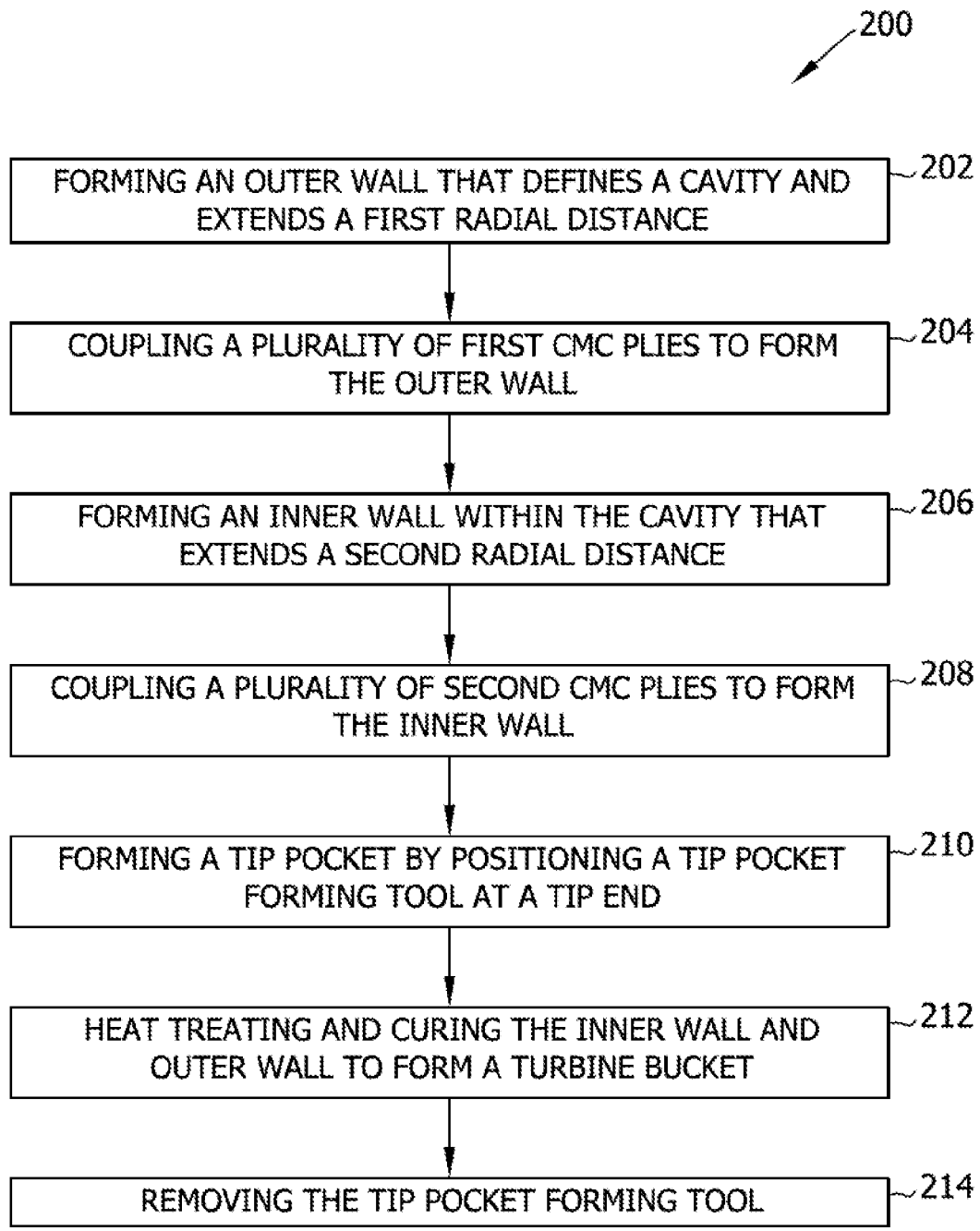

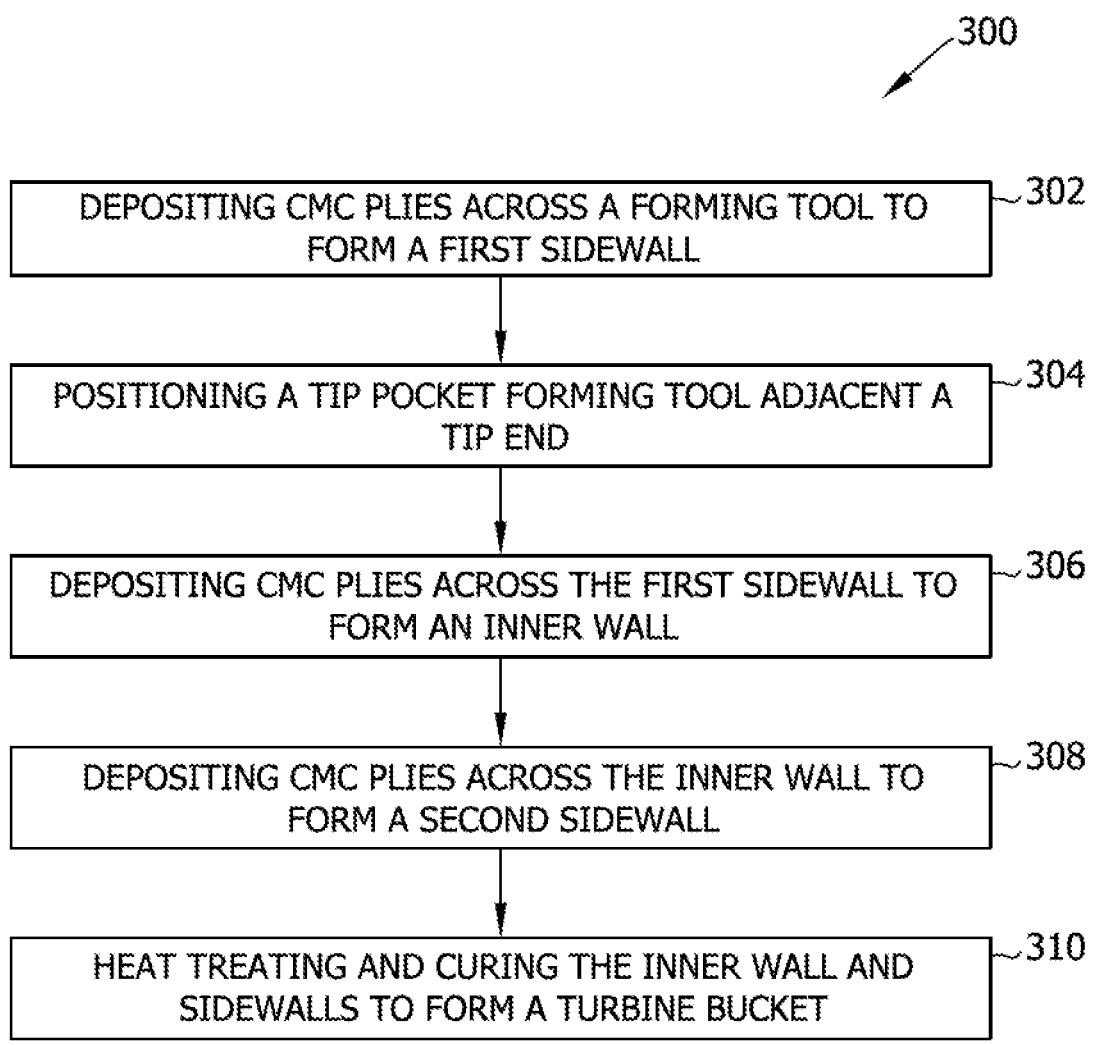

TURBINE BUCKET FOR USE IN GAS TURBINE ENGINES AND METHODS FOR FABRICATING THE SAME

STATEMENT REGARDING FEDERALLY SPONSORED RESEARCH & DEVELOPMENT

This invention was made with Government support under Contract No. DE-FC26-05NT42643, awarded by the Department of Energy. The Government has certain rights in this invention.

BACKGROUND OF THE INVENTION

The embodiments described herein relate generally to gas turbine engines, and more particularly, to a turbine bucket used with gas turbine engines.

At least some known gas turbine engines include a combustor, a compressor coupled downstream from the combustor, a turbine, and a rotor assembly rotatably coupled between the compressor and the turbine. At least some known rotor assemblies include a rotor shaft, at least one rotor disk coupled to the rotor shaft, and a plurality of circumferentially-spaced turbine buckets that are coupled to each rotor disk. Each turbine bucket includes an airfoil that extends radially outward from a platform towards a turbine casing.

During operation of at least some known turbines, the compressor compresses air, which is mixed with fuel and channeled to the combustor. The mixture is then ignited generating hot combustion gases that are then channeled to the turbine. The rotating turbine blades or buckets channel high-temperature fluids, such as combustion gases, through the turbine. The turbine extracts energy from the combustion gases for powering the compressor, as well as producing useful work to power a load, such as an electrical generator, or to propel an aircraft in flight.

At least some known gas turbine engines include Nickel based super alloys for the manufacture of advanced hot gas turbine blades. These blades need to be cooled in order to withstand the operating temperatures of combustion gases. This cooling flow is detrimental to the engine performance as it is not used to generate power at its most useful pressure and temperature state. Ceramic Matrix Composite (CMCs) materials could reduce, or eliminate, cooling flows due to their temperature resistance. These materials are sensitive to any sort of impact however, which requires the tip clearance between the casing and the blade to be increased due to rub events, which could prove catastrophic to the integrity of a blade. Increasing the clearance between the casing and the blade introduces tip leakage losses (also, clearance loss).

At least a portion of combustion gases channeled through at least some known turbines are channeled between a tip end of the airfoil and a turbine casing as tip clearance losses. Such tip clearance loses reduce the amount of combustion gases that is channeled through the main flow path and reduce an operating efficiency of the turbine.

BRIEF SUMMARY OF THE INVENTION

In one aspect, a turbine bucket for use with a turbine engine is provided. The turbine bucket includes an airfoil that extends between a root end and a tip end. The airfoil includes an outer wall that defines a cavity that extends from the root end to the tip end. The outer wall includes a first ceramic matrix composite (CMC) substrate that extends a first distance from the root end to the tip end. An inner wall is positioned within the cavity. The inner wall includes a second CMC substrate that extends a second distance from the root end towards the tip end that is different than the first distance.

In a further aspect, a turbine engine system is provided. The turbine engine system includes a compressor and a turbine coupled in flow communication with the compressor to receive at least some of the air discharged by the compressor. A rotor shaft is rotatably coupled to the turbine. The rotor shaft defines a centerline axis. A plurality of circumferentially-spaced turbine buckets are coupled to the rotor shaft. Each of the plurality of turbine buckets includes an airfoil that extends between a root end and a tip end. The airfoil includes an outer wall that defines a cavity that extends from the root end to the tip end. The outer wall includes a first ceramic matrix composite (CMC) substrate that extends a first distance from the root end to the tip end. An inner wall is positioned within the cavity. The inner wall includes a second CMC substrate that extends a second distance from the root end towards the tip end that is different than the first distance.

In another aspect, a method for manufacturing a turbine bucket for use in a turbine engine system is provided. The method includes forming an outer wall of an airfoil that extends between a root end and a tip end. The outer wall includes an inner surface that defines a cavity therein. The outer wall includes a first ceramic matrix composite (CMC) substrate extends a first distance from the root end to the tip end. An inner wall is formed within the cavity. The inner wall includes a second CMC substrate that extends a second distance from the root end towards the tip end that is different than the first distance. A tip pocket is formed at the tip end that is defined by the outer wall and the inner wall.

BRIEF DESCRIPTION OF THE DRAWINGS

FIG. 7 is a flow chart illustrating an exemplary method that may be used for manufacturing a turbine bucket for use in a turbine engine system shown in FIG. 1.

FIG. 8 is a flow chart illustrating an alternative method that may be used for manufacturing a turbine bucket for use in a turbine engine system shown in FIG. 1.

DETAILED DESCRIPTION OF THE INVENTION

The exemplary methods and systems described herein overcome at least some disadvantages of known turbine buckets by providing a turbine bucket that facilitates reducing the formation of leakage flows near a tip end of an airfoil of the turbine bucket. More specifically, the embodiments described herein provide an airfoil that is formed from ceramic matrix composite material, and defines a cavity at the tip end that is configured to facilitate reducing tip clearance losses by reducing an amount of combustion gases channeled between the tip end and a turbine casing by creating a known aerodynamic effect. By reducing the flow of combustion gases between the tip end and the turbine casing, the formation of vortices within a combustion gas flow path are reduced, thus increasing the performance and useful life of the rotor assembly.

As used herein, the term "upstream" refers to a forward or inlet end of a gas turbine engine, and the term "downstream" refers to an aft or nozzle end of the gas turbine engine.

Figure 1:
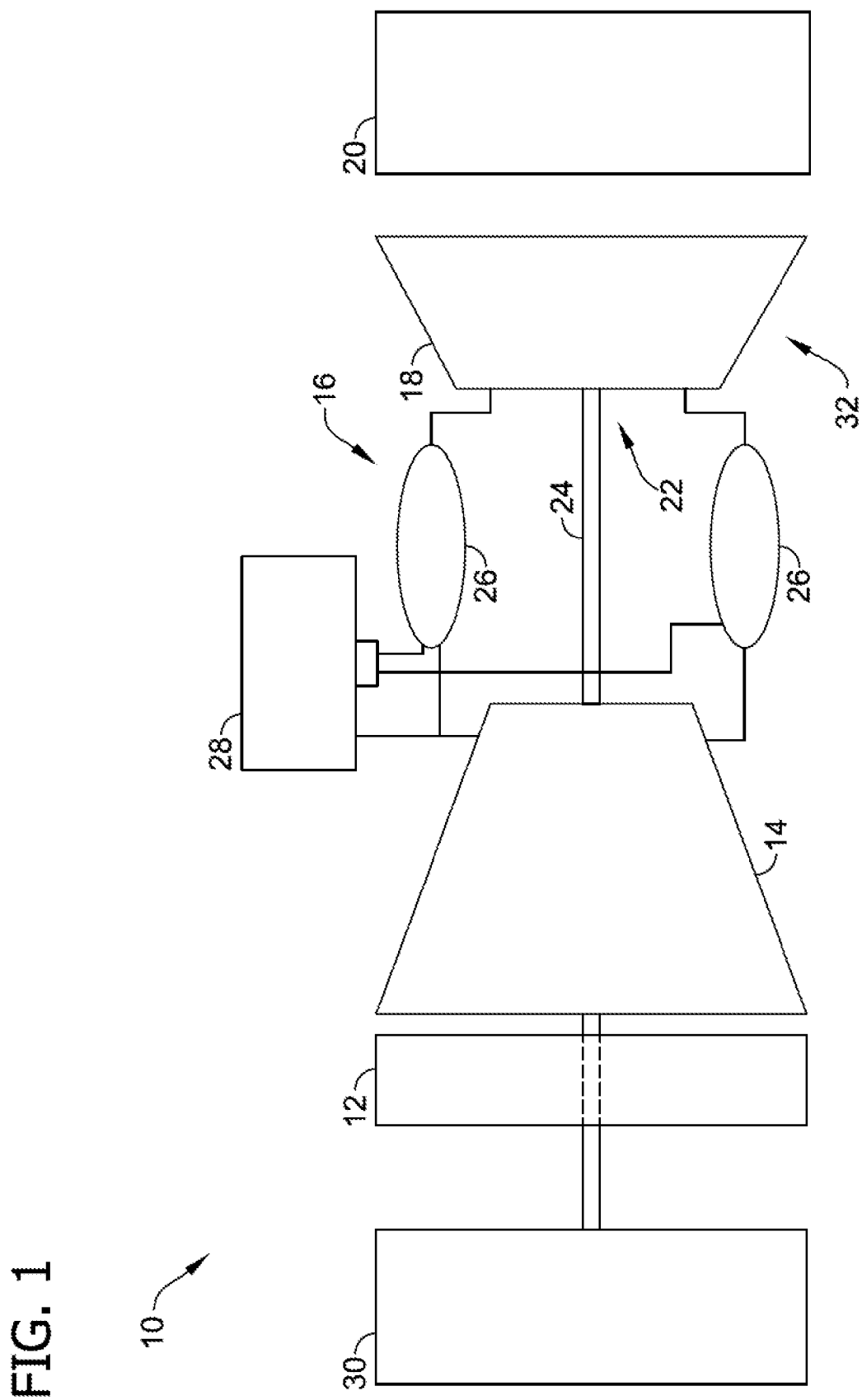
FIG. 1 is schematic illustration of an exemplary known turbine engine system.

FIG. 1 is a schematic view of an exemplary gas turbine engine system 10. In the exemplary embodiment, gas turbine engine system 10 includes an intake section 12, a compressor section 14 coupled downstream from intake section 12, a combustor section 16 coupled downstream from compressor section 14, a turbine section 18 coupled downstream from combustor section 16, and an exhaust section 20. Turbine section 18 includes a rotor assembly 22 that is coupled to compressor section 14 via a drive shaft 24. Combustor section 16 includes a plurality of combustors 26. Combustor section 16 is coupled to compressor section 14 such that each combustor 26 is in flow communication with compressor section 14. A fuel assembly 28 is coupled to each combustor 26 to provide a flow of fuel to combustor 26. Turbine section 18 is rotatably coupled to compressor section 14 and to a load 30 such as, but not limited to, an electrical generator and a mechanical drive application. In the exemplary embodiment, compressor section 14 and turbine section 18 each includes at least one rotor blade or turbine bucket 32 coupled to rotor assembly 22.

During operation, intake section 12 channels air towards compressor section 14. Compressor section 14 compresses the inlet air to a higher pressure and temperature and discharges the compressed air towards combustor section 16. The compressed air is mixed with fuel and ignited to generate combustion gases that flow to turbine section 18. Turbine section 18 drives compressor section 14 and/or load 30. Moreover, at least a portion of compressed air is supplied to fuel assembly 28. Fuel is channeled from fuel assembly 28 to each combustor 26 wherein it is mixed with the air and ignited in combustor section 16. Combustion gases are generated and channeled to turbine section 18 wherein gas stream thermal energy is converted to mechanical rotational energy. Exhaust gases exit turbine section 18 and flow through exhaust section 20 to ambient atmosphere.

Figure 2:
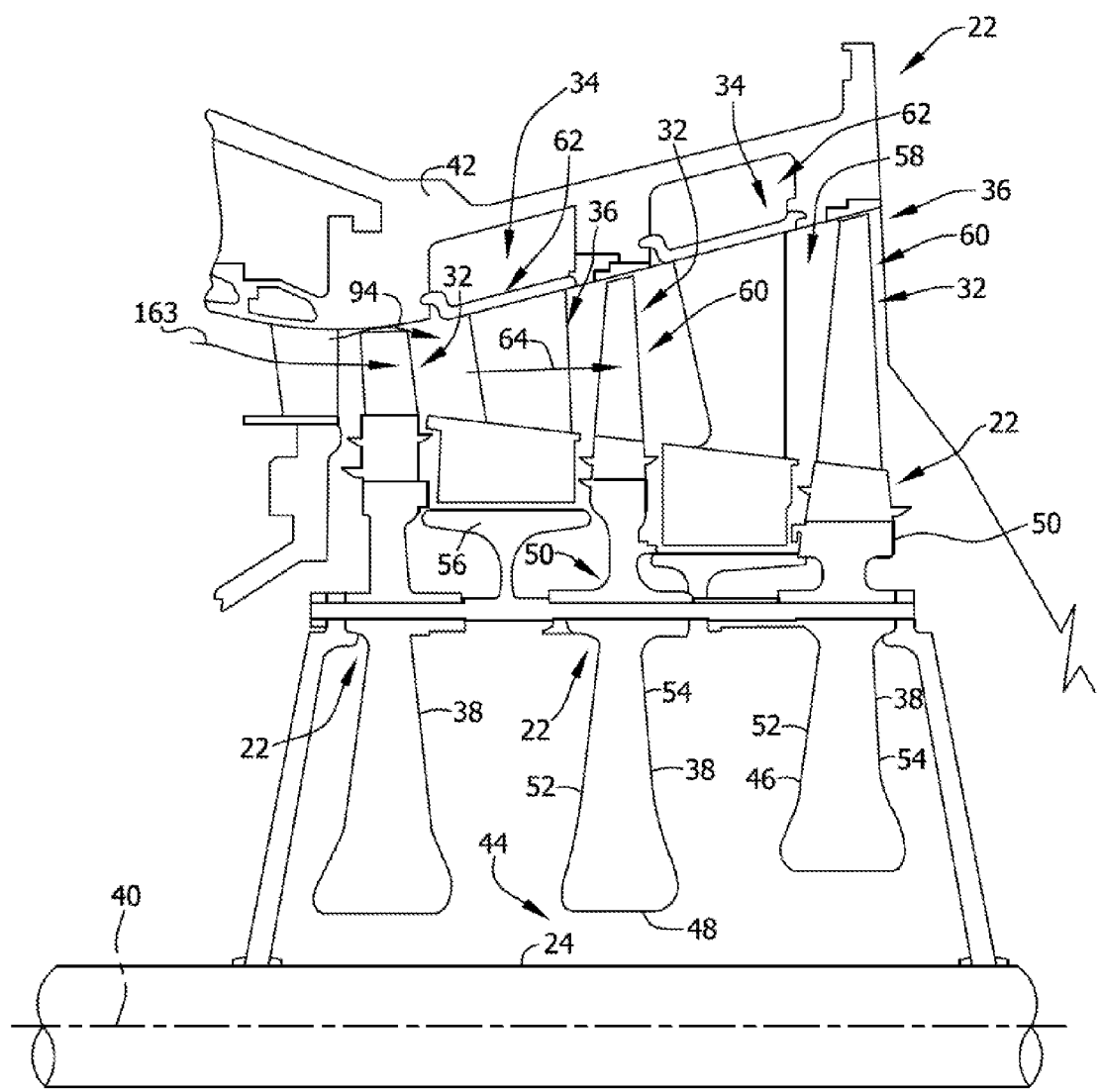
FIG. 2 is a partial sectional view of a portion of an exemplary rotor assembly that may be used with the turbine engine shown in FIG. 1.
Figure 3:
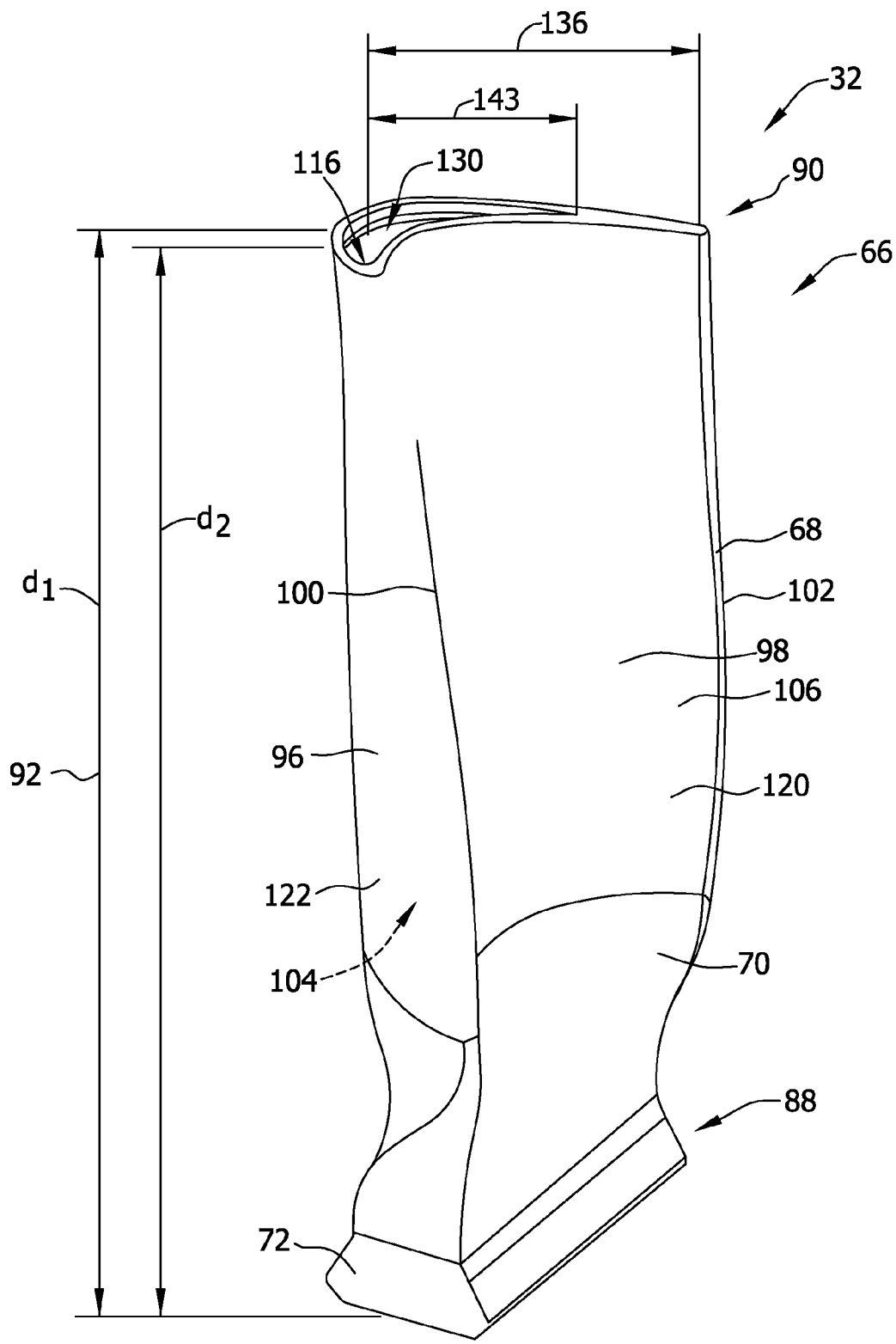
FIG. 3 is an enlarged perspective view of an exemplary turbine bucket that may be used with the turbine engine system shown in FIG. 1.
Figure 4:
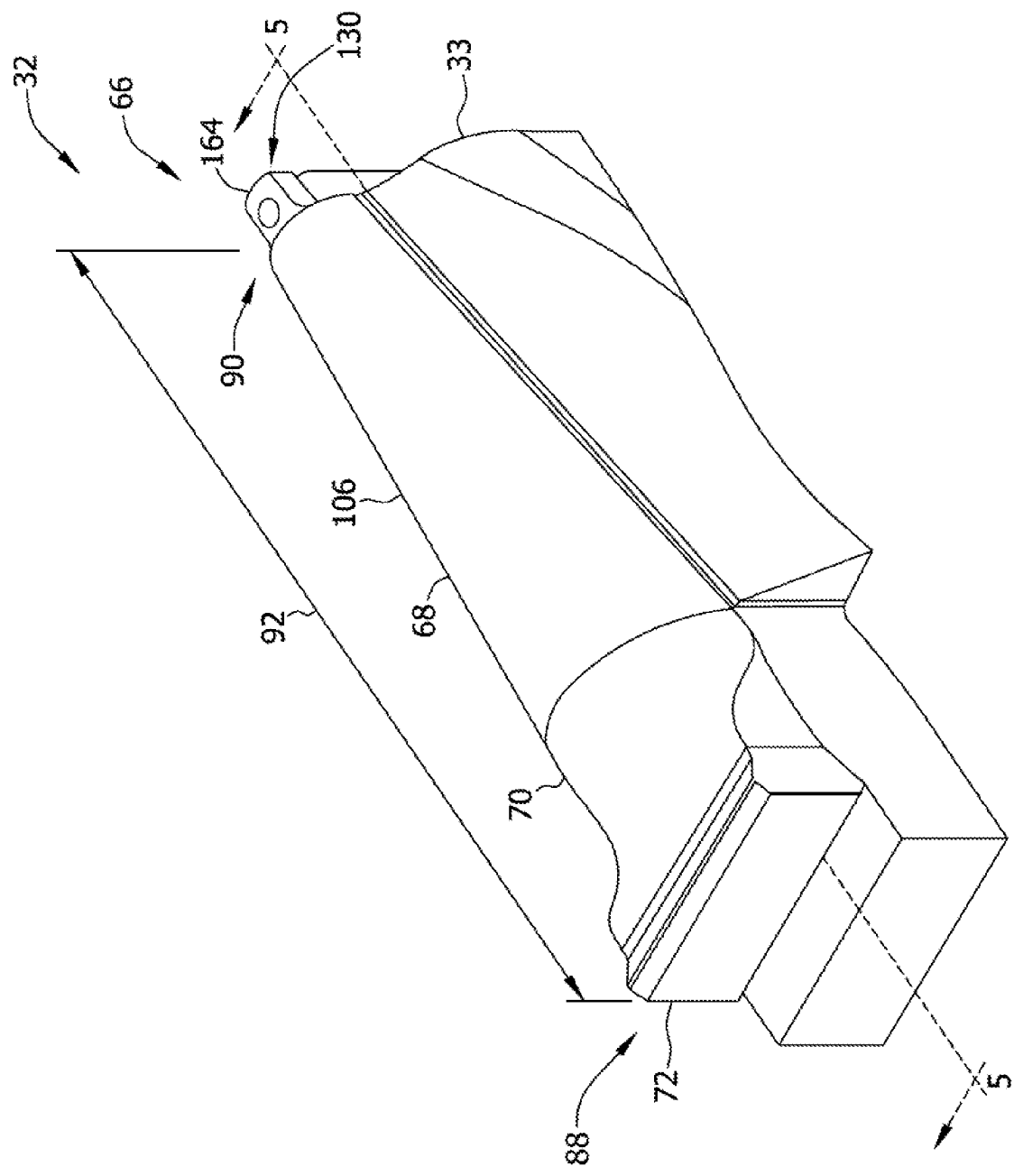
FIG. 4 is an enlarged perspective view of the turbine bucket shown in FIG. 3 including an exemplary airfoil forming tool.
Figure 5:
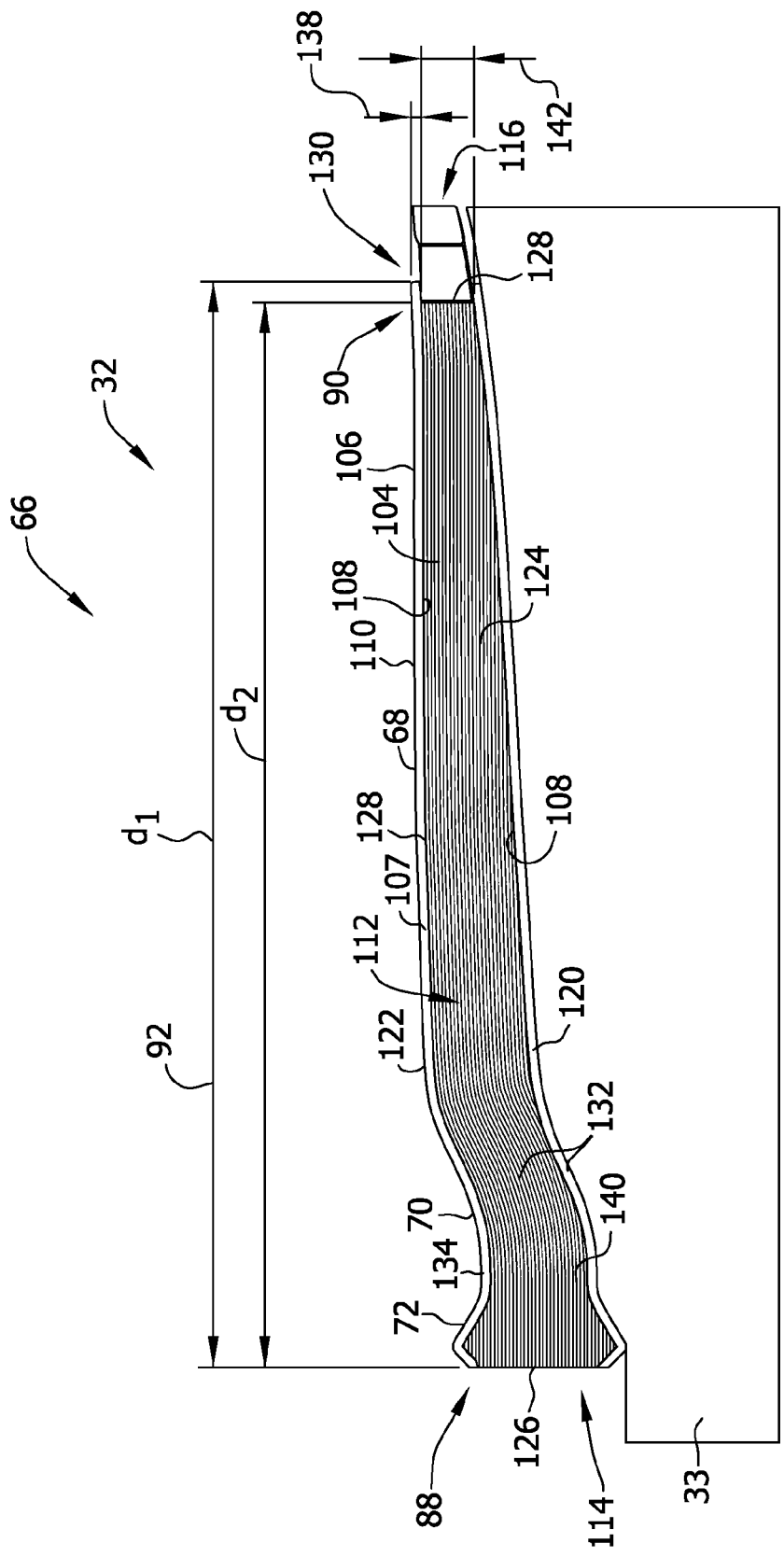
FIG. 5 is a cross-sectional view of the turbine bucket shown in FIG. 4 and taken along line 5-5.

FIG. 2 is an enlarged perspective view of an exemplary embodiment of rotor assembly 22 that may be used with gas turbine engine system 10 (shown in FIG. 1). FIG. 3 is an enlarged perspective view of an exemplary embodiment of turbine bucket 32 that may be used with the gas turbine engine system 10. FIG. 4 is an enlarged perspective view of turbine bucket 32 including an airfoil forming tool 33. FIG. 5 is a cross-sectional view of turbine bucket 32 taken along sectional line 5-5 in FIG. 4. In the exemplary embodiment, turbine section 18 includes a plurality of stages 34 that each include a row of turbine buckets 32 and a stationary row of stator vanes 36. Turbine buckets 32 each extend radially outward from a rotor disk 38. Each rotor disk 38 is coupled to drive shaft 24 and rotates about a centerline axis 40 that is defined by drive shaft 24. A turbine casing 42 extends circumferentially about rotor assembly 22 and stator vanes 36. Stator vanes 36 are each coupled to casing 42 and extend radially inward from casing 42 towards drive shaft 24.

In the exemplary embodiment, each rotor disk 38 is annular and includes a central bore 44 that extends substantially axially therethrough. More specifically, a disk body 46 extends radially outwardly from central bore 44 and is oriented substantially perpendicularly to centerline axis 40. Central bore 44 is sized to receive drive shaft 24 therethrough. Disk body 46 extends radially between a radially inner edge 48 and a radially outer edge 50, and axially from an upstream surface 52 to an opposite downstream surface 54. Upstream surface 52 and downstream surface 54 each extend between inner edge 48 and outer edge 50. A support arm 56 extends between adjacent rotor disks 38 to form rotor assembly 22.

Each turbine bucket 32 is coupled to disk outer edge 50 and is spaced circumferentially about rotor disk 38. Adjacent rotor disks 38 are oriented such that a gap 58 is defined between each row 60 of circumferentially-spaced turbine bucket 32. Gap 58 is sized to receive a row 62 of stator vanes 36 that are spaced circumferentially about drive shaft 24. Stator vanes 36 are oriented to channel combustion gases downstream towards turbine bucket 32. A combustion gas path 64 is defined between turbine casing 42 and each rotor disk 38. Each row 60 and 62 of turbine bucket 32 and stator vanes 36 extends at least partially through a portion of combustion gas path 64.

In the exemplary embodiment, each turbine bucket 32 extends radially outwardly from disk body 46. Each turbine bucket 32 includes an airfoil 66 that includes an airfoil portion 68, a shank 70, and a dovetail 72. Shank 70 extends between airfoil potion 68 and dovetail 72 such that each airfoil portion 68 extends radially outwardly from shank 70 towards turbine casing 42. Shank 70 extends radially inwardly from airfoil portion 68 to dovetail 72. Dovetail 72 extends radially inwardly from shank 70 and enables turbine bucket 32 to securely couple to rotor disk 38.

Airfoil 66 extends radially between a root end 88 and a tip end 90 with a radial length 92 defined therebetween. Root end 88 includes dovetail 72. Airfoil 66 extends radially outwardly from root end 88 towards turbine casing 42 such that tip end 90 is positioned adjacent turbine casing 42 to define a tip fluid flow path 94 (shown in FIG. 2) between tip end 90 and turbine casing 42. Tip fluid flow path 94 channels at least a portion of the combustion gases between tip end 90 and turbine casing 42. Airfoil 66 also includes a pressure side 96 and an opposite suction side 98. Each side 96 and 98 extends generally axially between a leading edge 100 and an opposite trailing edge 102. Moreover, in the exemplary embodiment, pressure side 96 includes a generally concave portion and suction side 98 includes a generally convex portion.

In the exemplary embodiment, airfoil 66 is fabricated from ceramic matrix composite (CMC) material. Airfoil 66 includes an inner wall 104 and an outer wall 106. Outer wall 106 includes a first CMC substrate 107 that extends between root end 88 and tip end 90, and includes an inner surface 108 and an outer surface 110 Inner surface 108 defines a cavity 112 that extends between root end 88 and tip end 90. Moreover, inner surface 108 defines an opening 114 at root end 88 and an opening 116 at tip end 90 such that cavity 112 extends between root end opening 114 and tip end opening 116. In the exemplary embodiment, outer wall 106 extends a first distance $d_1$ from root end 88 to tip end 90. Inner wall 104 is positioned within cavity 112 and includes an outer surface 128 that is positioned adjacent to wall inner surface 108. In the exemplary embodiment, outer wall 106 includes a first sidewall 120 and a second sidewall 122 that are coupled together to form outer wall 106. In one embodiment, first sidewall 120 is coupled to second sidewall 122 along leading edge 100, and along trailing edge 102. Moreover, first sidewall 120 defines suction side 98, and second sidewall 122 defines pressure side 96.

In the exemplary embodiment, inner wall 104 includes a second CMC substrate material 124 that extends between a radially inner surface 126 and a radially outer surface 128. Radially inner surface 126 is positioned adjacent to root end 88. Inner wall 104 extends a second distance $d_2$ from root end 88 towards tip end 90. Second distance $d_2$ is different than first distance $d_1$ of outer wall 106. In the exemplary embodiment, first distance $d_1$ is longer than second distance $d_2$ such that a tip pocket 130 is defined at tip end 90. Tip pocket 130 is defined by radially outer surface 128, by inner surface 108, and by tip end opening 116, and is sized and shaped to facilitate reducing a flow of air across tip end 90 and through tip fluid flow path 94. In one embodiment, tip pocket 130 has an airfoil shape. Alternatively, tip pocket 130 may have any suitable shape that enables turbine bucket 32 to function as described herein. In the exemplary embodiment, outer surface 110 extends over pressure and suction sides 96 and 98, respectively. Inner wall 104 extends over pressure side 96 and suction side 98, and extends from leading edge 100 to trailing edge 102 such that radially outer surface 128 extends continuously across tip pocket 130 and within cavity 112.

Walls 104 and 106 each are formed from a plurality of CMC plies 132. In one embodiment, outer wall 106 includes a plurality of first CMC plies 134 that are coupled together with a width 136 extending between leading edge 100 and trailing edge 102. Moreover, outer wall 106 has a thickness 138 defined between inner surface 108 and outer surface 110. In the exemplary embodiment, inner wall 104 includes a plurality of second CMC plies 140 that are different than first CMC plies 134. Second CMC plies 140 are coupled together to form inner wall 104 with thickness 142 defined between pressure side 96 and suction side 98, and a width 143 defined between leading edge 100 and trailing edge 102. In the exemplary embodiment, inner wall thickness 142 is greater than outer wall thickness 138. Alternatively, inner wall thickness 142 may be less than, or approximately equal to outer wall thickness 138.

Figure 6:
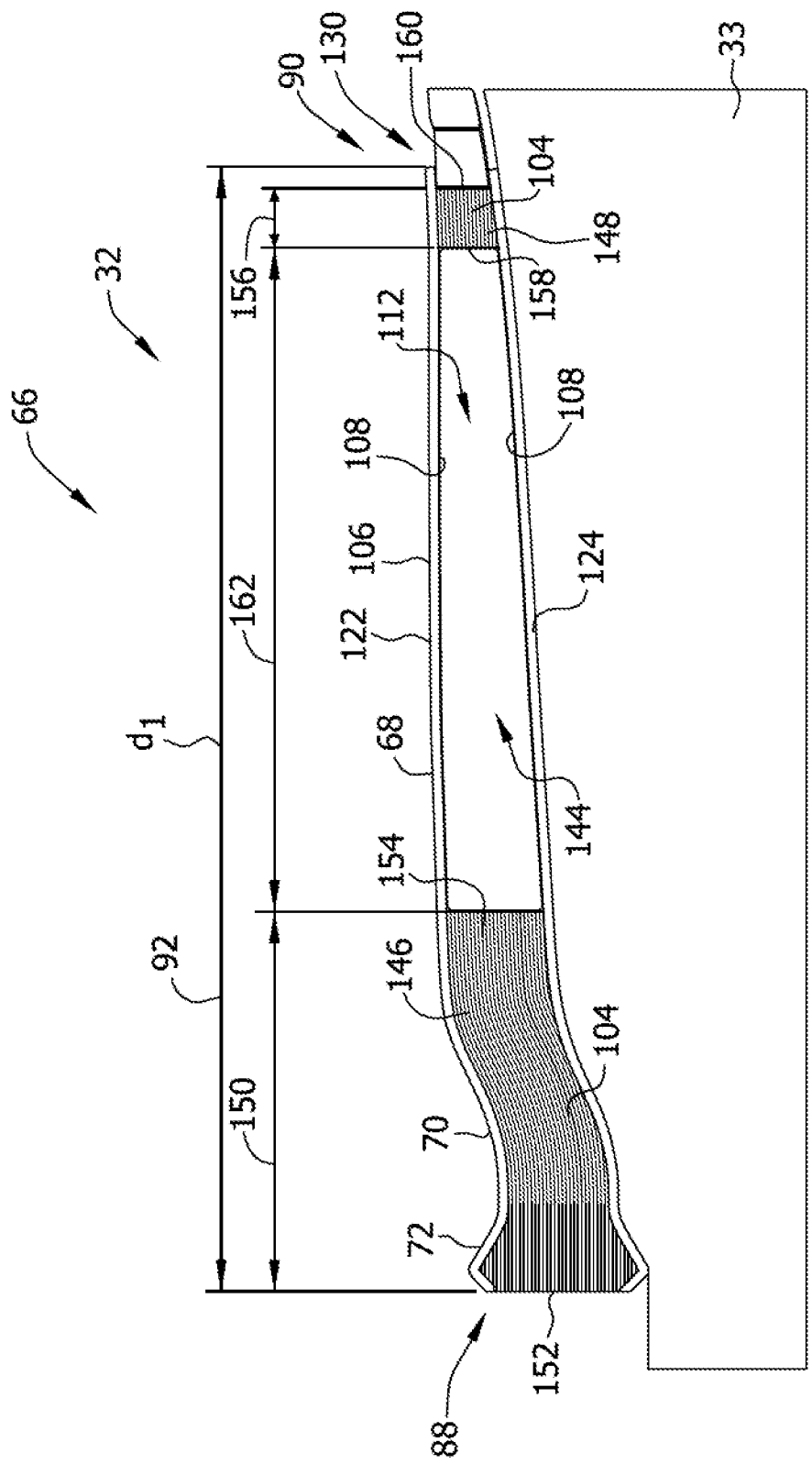
FIG. 6 is a cross-sectional view of an alternative turbine bucket that may be used with the turbine engine system shown in FIG. 1.

FIG. 6 is a cross-sectional view of an alternative embodiment of turbine bucket 32. In an alternative embodiment, turbine bucket 32 includes a plurality of inner walls 104 that are positioned within cavity 112 such that turbine bucket 32 is formed with one or more interior chambers 144. Turbine bucket 32 includes a first inner wall 146 and at least a second inner wall 148. First inner wall 146 includes a length 150 that extends between a radially inner surface 152 and a radially outer surface 154, and is positioned with respect to outer wall 106 such that inner surface 152 defines root end 88. First inner wall 146 extends from root end 88 towards airfoil portion 68 such that first inner wall 146 extends through dovetail 72, shank 70, and at least a portion of airfoil portion 68. Second inner wall 148 includes a length 156 that extends from a radially inner surface 158 and a radially outer surface 160 and is positioned with respect to outer wall 106 such that outer surface 160 defines tip pocket 130. In the exemplary embodiment, first inner wall length 150 is longer than second inner wall length 156. Alternatively, first inner wall length 150 may be shorter than, or approximately equal to second inner wall length 156.

First inner wall 146 is positioned with respect to second inner wall 148 such that interior chamber 144 is defined between inner surface 158 and outer surface 154. Interior chamber 144 includes a length 162 that extends between inner and outer surfaces 158 and 154. In one embodiment, interior chamber length 162 is longer than first inner wall length 150 and second inner wall length 156. Alternatively, interior chamber length 162 may be shorter than, or approximately equal to first inner wall length 150 and/or second inner wall length 156. Interior chamber 144 facilitates reducing an overall weight of turbine bucket 32. In one embodiment, airfoil 66 includes a plurality of support structures (not shown) that are positioned within interior chamber 144 and are coupled between first and second sidewalls 120 and 122, and/or between first and second inner walls 146 and 148 to facilitate increasing a structural integrity of airfoil 66.

Referring to FIGS. 1-3, during operation, compressor section 14 (shown in FIG. 1) compresses air and discharges compressed air into combustor section 16 (shown in FIG. 1) and towards turbine section 18. The majority of air discharged from compressor section 14 is channeled towards combustor section 16. More specifically, pressurized compressed air is channeled to combustors 26 (shown in FIG. 1) wherein the air is mixed with fuel and ignited to generate high temperature combustion gases 163. Combustion gases 163 are channeled towards combustion gas path 64, wherein the gases 163 impinge against turbine buckets 32 and stator vanes 36 to impart a rotational force on rotor assembly 22. At least a portion of combustion gases 163 are directed towards tip fluid flow path 94, and are channeled between tip end 90 and turbine casing 42. As combustion gases 163 flow through tip fluid flow path 94, tip pocket 130 facilitates reducing a flow of combustion gases 163 through tip fluid flow path 94. Specifically, vortices form within tip pocket 130 that increase the air pressure within tip pocket 130 and within tip fluid flow path 94. As air pressure within tip pocket 130 increases, the undesirable flow of combustion gases 163 through tip fluid flow path 94 is reduced.

FIG. 7 is a flow chart illustrating an exemplary method 200 for fabricating turbine bucket 32. In the exemplary embodiment, method 200 includes forming 202 outer wall 106 that defines cavity 112 therein and extends first distance $d_1$ from root end 88 to tip end 90. A plurality of first CMC plies 132 is coupled 204 together to form outer wall 106. Inner wall 104 is formed 206 within cavity 112 and extends second distance $d_2$ from root end 88 towards tip end 90 that is different than first distance $d_1$. A plurality of second CMC plies 140 is coupled 208 together to form inner wall 104. A tip pocket forming tool 164 is positioned at least partially within cavity 112 and is inserted through tip end opening 116 to form 210 tip pocket 130 at tip end 90. Turbine bucket 32 is heat treated and cured 212 to a predefined temperature for a predefined period of time to obtain a desired porosity, hardness, and shape of outer walls 104 and 106. Tip pocket forming tool 164 is removed 214 after heat treating and curing 212 turbine bucket 32.

FIG. 8 is a flow chart illustrating an alternative method 300 for fabricating turbine bucket 32. In the exemplary embodiment, method 300 includes depositing 302 first CMC plies 132 across an outer surface 166 of airfoil forming tool 33 to form first sidewall 120. CMC plies 132 are deposited in a plurality of layers to form first sidewall 120 such that first sidewall 120 extends first distance $d_1$ between root end 88 and tip end 90. Tip pocket forming tool 164 is positioned 304 adjacent tip end 90 to facilitate forming tip pocket 130. Second CMC plies 140 are deposited 306 across inner surface 108 of first sidewall 120 from root end 88 to tip pocket forming tool 164 to form inner wall 104. Second CMC plies 140 are deposited in a plurality of layers to form inner wall 104 extending second distance $d_2$ from root end 88 that is shorter than first distance $d_1$. First CMC plies 132 are deposited 308 across inner wall 104 to form second sidewall 122 and enclose inner wall 104 within cavity 112. CMC plies 132 are deposited in a plurality of layers to form second sidewall 122 extending first distance $d_1$ from root end 88 and tip end 90. A portion of second sidewall layers overlap first sidewall 122 to form outer wall 104 and enclose inner wall 106 within cavity 112. A high temperature heat treatment and curing process is applied 310 to cure inner wall 104 and first and second sidewalls 120 and 122 to turbine bucket 32. The associated heat treatment temperatures and time periods may vary based on a plurality of parameters that may include, but not be limited to, the number of CMC plies and the thicknesses of inner wall 104 and outer wall 106. Tip pocket forming tool 164 is removed from tip pocket 130 and turbine bucket 32 after completion of the high temperature heat treatment.

In an alternative embodiment, method 300 includes removably positioning a interior shaping tool (not shown) across a portion of first sidewall 120 to facilitate forming one or more interior chambers 144. A first set of CMC plies are deposited in a plurality of layers across a first portion of inner surface 108 of first sidewall 120 from root end 88 to the interior shaping tool to form first inner wall 146 extending from root end 88 to the interior shaping tool. A second set of CMC plies are deposited over a second portion of inner surface 108 from the interior shaping tool to tip pocket forming tool 164 to form second inner wall 148 extending from the interior shaping tool to tip pocket forming tool 164. A third set of CMC plies are deposited across first and second inner walls 146 and 148, the interior core shaping tool, and tip pocket forming tool 164 to from second sidewall 122 and enclose inner walls 146 and 148 within cavity 112. In one embodiment, the interior core shaping tool may include a material including a melting temperature that is less than the curing temperature of the CMC plies to facilitate removing the interior core shaping tool during the curing process. Alternatively, the interior core shaping tool may include a collapsible mandrel that is configured to be removed through a slot (not shown) defined through inner walls 146 and 148 and/or outer sidewalls 120 and 122. In an alternative embodiment, the interior core shaping tool includes a plurality of plurality of support structures that are coupled between first and second sidewalls 120 and 122, and/or between first and second inner walls 146 and 148 to facilitate increasing a structural integrity of turbine bucket 32.

The above-described turbine bucket overcome at least some disadvantages of known solid tip turbine buckets by reducing a flow of combustion gases between the turbine bucket and a turbine casing. Known gas turbine engines include Nickel based gas turbine blades that require cooling fluids to be used to reduce the operating temperature of the blade to withstand the operating temperatures of combustion gases. Ceramic Matrix Composite (CMCs) blades include an increased temperature resistance compared to nickel based blades and may reduce the need for cooling flows. CMC blades have a lower resistance to impact as compared to nickel based blades, and require the tip clearance between the casing and the blade to be increased to avoid rub events between the CMC blade and the turbine casing. Increasing the clearance between the casing and the CMC blade introduces tip leakage losses across the CMC blade tip end. By providing a turbine bucket that includes a tip pocket at a tip end, vortices are formed within the tip pocket that increase the air pressure between the turbine bucket and the turbine casing. The increased air pressure facilitates reducing a flow of combustion gases between the turbine bucket and the turbine casing. By reducing the flow of combustion gases across the tip pocket, tip clearance losses between the turbine bucket and the turbine casing and secondary flow losses that are generated within the main gas path are reduced, thus reducing the losses in gas energy and increasing the operating efficiency of the turbine engine. In addition, the incidents of tip rubbing events is reduced which facilitates a safe operation of CMC blades. By adding a tip pocket, the operating clearance may be increased to reduce the likelihood of a CMC bucket rub against the casing, while maintaining an acceptable clearance leakage related loss due to tip pocket geometry.

Exemplary embodiments of a turbine bucket for use in a turbine engine and method for assembling the same are described above in detail. The methods and apparatus are not limited to the specific embodiments described herein, but rather, components of systems and/or steps of the method may be utilized independently and separately from other components and/or steps described herein. For example, the methods and apparatus may also be used in combination with other combustion systems and methods, and are not limited to practice with only the gas turbine engine assembly as described herein. Rather, the exemplary embodiment can be implemented and utilized in connection with many other combustion system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine bucket for use with a turbine engine, said turbine bucket comprising:
    an airfoil extending between a root end and a tip end, said airfoil comprising:
        an outer wall defining a cavity extending from said root end to said tip end, said outer wall comprising a first ceramic matrix composite (CMC) substrate extending a first distance from said root end to said tip end; and
        an inner wall positioned within said cavity, said inner wall comprising a second CMC substrate extending a second distance from said root end towards said tip end that is different than said first distance,
    wherein said first distance is greater than said second distance such that a tip pocket is defined at said tip end to facilitate reducing a flow of air across said tip end.

2. The turbine bucket in accordance with claim 1, wherein said inner wall comprises an outer surface positioned at the second distance, said outer wall comprises an inner surface, said tip pocket defined between said inner surface and said outer surface.

3. The turbine bucket in accordance with claim 2, wherein said outer wall includes a pressure side and an opposite suction side, said pressure side and said suction side extending between a leading edge and a trailing edge, said outer surface of said inner wall extends continuously between said pressure side and said suction side.

4. The turbine bucket in accordance with claim 3, wherein said inner surface of said outer wall defines said tip pocket having a substantially airfoil shape.

5. The turbine bucket in accordance with claim 2, wherein said inner wall comprises an inner surface that defines a interior chamber that extends between said inner surface and said root end.

6. The turbine bucket in accordance with claim 1, wherein said inner wall has a thickness greater than a thickness of said outer wall.

7. The turbine bucket in accordance with claim 1, wherein said outer wall comprises an inner surface defining an opening at each of said root end and said tip end.

8. A turbine engine system comprising:
    a compressor;
    a turbine coupled in flow communication with said compressor to receive at least some of the air discharged by said compressor;
    a rotor shaft rotatably coupled to said turbine, said rotor shaft defining a centerline axis; and
    a plurality of circumferentially-spaced turbine buckets coupled to said rotor shaft, each of said plurality of turbine buckets comprising:
        an airfoil extending between a root end and a tip end, said airfoil comprising:
            an outer wall defining a cavity extending from said root end to said tip end, said outer wall comprising a first ceramic matrix composite (CMC) substrate extending a first distance from said root end to said tip end; and
            an inner wall positioned within said cavity, said inner wall comprising a second CMC substrate extending a second distance from said root end towards said tip end that is different than said first distance,
        wherein said first distance is greater than said second distance such that a tip pocket is defined at said tip end to facilitate reducing a flow of air across said tip end.

9. The turbine engine system in accordance with claim 8, wherein said inner wall comprises an outer surface positioned at the second distance, said outer wall comprises an inner surface, said tip pocket defined between said inner surface and said outer surface.

10. The turbine engine system in accordance with claim 9, wherein said outer wall includes a pressure side and an opposite suction side, said pressure side and said suction side extending between a leading edge and a trailing edge, said outer surface of said inner wall extends continuously between said pressure side and said suction side.

11. The turbine engine system in accordance with claim 10, wherein said inner surface of said outer wall defines said tip pocket having a substantially airfoil shape.

12. The turbine engine system in accordance with claim 9, wherein said inner wall comprises an inner surface that defines an interior chamber that extends between said inner surface and said root end.

13. The turbine engine system in accordance with claim 8, wherein said inner wall has a thickness greater than a thickness of said outer wall.

14. The turbine engine system in accordance with claim 8, wherein said outer wall comprises an inner surface defining an opening at each of said root end and said tip end.

15. A method for fabricating a turbine bucket for use in a turbine engine system, said method comprising:
    forming an outer wall of an airfoil that extends between a root end and a tip end, the airfoil including a dovetail region adjacent the root end, the outer wall including an inner surface that defines a cavity therein, wherein the cavity extends a first distance from the root end to the tip end;
    forming an inner wall within the cavity, the inner wall extending a second distance from the root end towards the tip end that is different than the first distance and substantially beyond said dovetail region;
    forming the outer wall from a first ceramic matric composite (CMC) and the inner wall from a second CMC different from the first CMC; and
    forming a tip pocket at the tip end that is defined by the outer wall and the inner wall.

16. The method in accordance with claim 15, wherein the outer wall includes a plurality of sidewalls, said method further comprises depositing a plurality of first ceramic plies across a forming tool to form a first sidewall of the outer wall.

17. The method in accordance with claim 16, further comprising:
    positioning a shaping tool at the tip end to facilitate forming the tip pocket; and
    depositing a plurality of second ceramic plies across the first sidewall of the outer wall to form the inner wall.

18. The method in accordance with claim 17, further comprising:
    depositing a plurality of third ceramic plies across the inner wall to form a second sidewall; and
    coupling the second sidewall to the first sidewall to form the outer wall.

* * * * *